United States Patent

[11] 3,593,607

| | | |
|---|---|---|
| [72] | Inventor | Curt Munchbach<br>Pforzheim-Sonnenberg, Germany |
| [21] | Appl. No. | 782,328 |
| [22] | Filed | Dec. 9, 1968 |
| [45] | Patented | July 20, 1971 |
| [73] | Assignee | Irma Ungerer nee Dollinger<br>Pforzheim, Arlingerstr, Germany |
| [32] | Priority | Feb. 10, 1968 |
| [33] | | Germany |
| [31] | | P 16 50 881.9 |

[54] ARTICULATED ROTARY TRANSMISSION AND SHEARS COMPRISING THE SAME
9 Claims, 8 Drawing Figs.

[52] U.S. Cl. .................................................. 83/311,
74/68, 74/393, 83/324
[51] Int. Cl. .................................................. B23d 25/06,
B23d 25/12
[50] Field of Search .......................................... 83/311,
324; 74/393, 68, 64

[56] References Cited
UNITED STATES PATENTS

| | | | |
|---|---|---|---|
| 2,215,762 | 9/1940 | Morrison ...................... | 83/324 X |
| 2,248,444 | 7/1941 | Torok .......................... | 74/68 X |
| 3,003,380 | 10/1961 | Moser et al. .................. | 83/311 X |

*Primary Examiner*—James M. Meister
*Attorney*—Polachek and Saulsbury

ABSTRACT: A quadrilateral linkage comprises a double articulated joint having input and output members which are mounted on a common central axis for rotation relative to each other, an outer articulated joint adapted to revolve about said axis, and first and second lateral articulated joints connecting said outer articulated joint to said input and output members, respectively. The outer articulated joint is movable to vary the distance between it and said double articulated joint and thus to vary the relation of the angular velocities of said input and output members.

PATENTED JUL20 1971 3,593,607

INVENTOR.
Curt Münchbach
By
Polachek & Saulsbury
ATTORNEYS

INVENTOR.
Curt Münchbach

INVENTOR
Curt Münchbach
By
Polachek & Saulsbury
ATTORNEYS

ARTICULATED ROTARY TRANSMISSION AND SHEARS COMPRISING THE SAME

This invention relates to an articulated rotary transmission in the form of a quadrilateral linkage for varying speeds, particularly for driving flying and rotary shears for severing traveling stock, which shears have knives which move in the direction of travel of the strip at a speed which is adjustable to vary the length of the cut sections, irrespective of the speed of travel of the strip.

Rotary quadrilateral linkages consisting of double cranks have already been used to drive rotating shears. In such an arrangement, the change of speed between the input having a constant speed and the output having a varying speed will depend on the angular position, so that the change of speed cannot be readily varied as desired although such variation is required within wide limits in order to move cutting knives at the speed of travel and in the direction of travel of the stock to be cut, particularly in the case of strip metal, which is to be divided into sections of different lengths.

This is enabled according to the invention by the provision of a rotary articulated transmission consisting of a quadrilateral linkage for varying speeds, which transmission is characterized in that the central double articulated joint (central articulated joint) is rotationally mounted and the input and output speeds of the two lateral articulated joints and of their links and consequently of the input and output members are variable relative to each other by a change of the distance from the central articulated joint to the outer articulated joint.

The distance from the central articulated joint to the outer joint may be changed in that the latter moves along a predetermined cam or by an interposed positioning member, e.g., a piston-cylinder unit. Finally, the distance from the central articulated joint to the outer articulated joint may be changed by a constraining rod, which has a pivot that is adjustable relative to the central articulated joint.

Various embodiments of the invention are shown by way of example in the drawing, in which.

Figure 1:
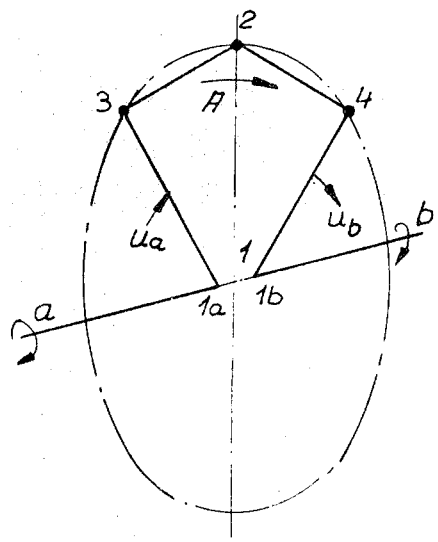
FIG. 1 is a perspective view showing the basic concept of the invention.

FIG. 1 shows in a perspective view an articulated transmission according to the invention. The transmission rotates in the direction A and comprises a centrally mounted double articulated joint $1a$, $1b$ having an input member $a$ and an output member $b$ rotating at angular velocities $ua$ and $ub$, respectively. The outer articulated joint 2 is disposed opposite to the central articulated joint 1 and is connected by the lateral articulated joints 3, 4 to $1a$ and $1b$, respectively.

Figure 3:
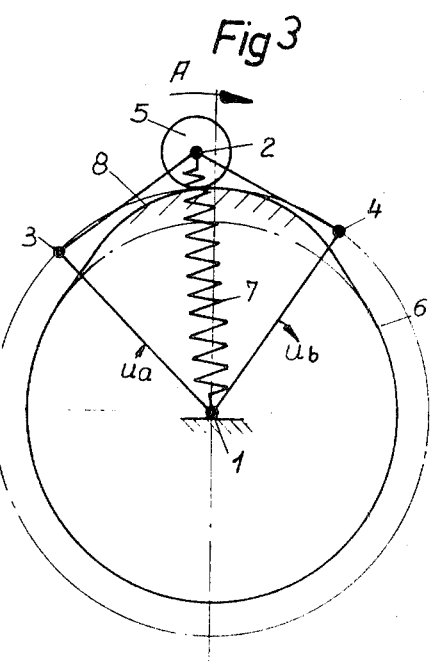
FIGS. 2 and 3 are diagrammatic views showing a first embodiment of an articulated rotary transmission.
Figure 2:
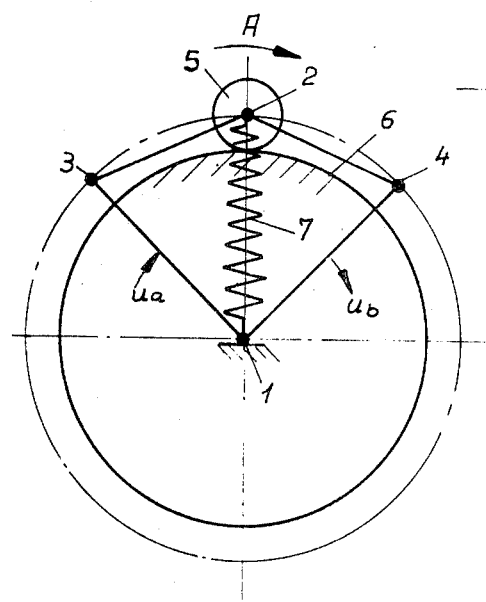

FIGS. 2 and 3 are diagrammatic views showing an articulated transmission according to the invention. The outer articulated joint 2 is provided with a roller 5, which is urged by a spring 7 to contact the cam 6 and to move along the same when the transmission is driven in the direction A. In the arrangement shown in FIG. 1, the input velocity $ua$ and the output velocity $ub$ are equal. If the cam 6 is provided with a hump 8, as is shown in FIG. 3, the velocity $ub$ will vary if the velocity $ua$ remains constant. $ub$ will be reduced until the top of the hump is reached and will subsequently be increased. The cam may be designed to vary the output velocity $ub$ relative to the input velocity $ua$ or vice versa during each revolution.

Figure 4:
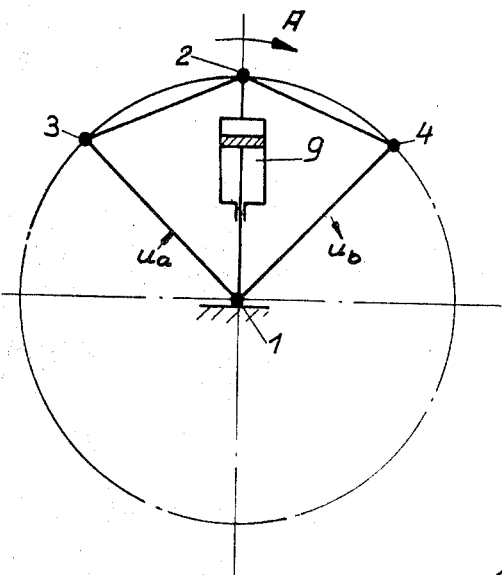
FIGS. 4 and 5 are diagrammatic views showing a second embodiment of an articulated rotary transmission.
Figure 5:
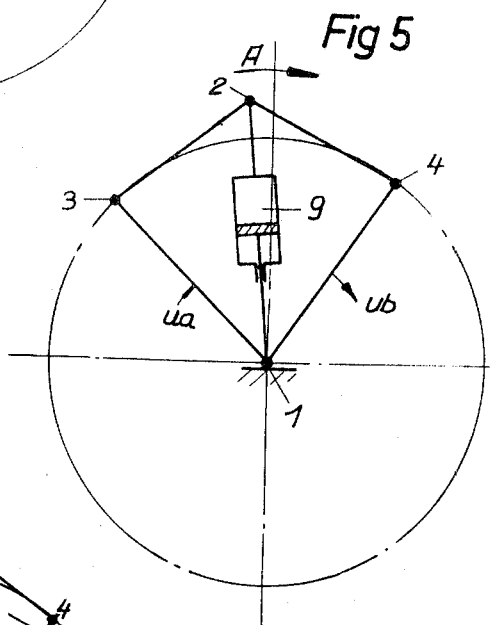

FIGS. 4 and 5 show another articulated transmission 1 to 4 according to the invention. In this case the distance between the central articulated joint 1 and the outer articulated joint 2 is changed by a pneumatic or hydraulic piston unit 9 so that the input velocity $ua$ and the output velocity $ub$ may be varied just as in the preceding embodiment. The piston unit 9 may be replaced by an electric actuator or the like.

Figure 6:
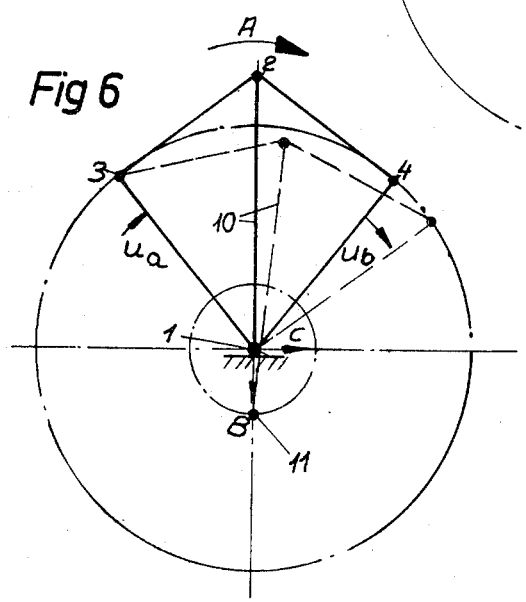
FIG. 6 is a diagrammatic view showing a third embodiment of an articulated rotary transmission.

FIG. 6 shows a third embodiment of an articulated transmission 1 to 4 according to the invention. The means for positioning the outer articulated joint 2 comprise a constraining rod 10 connected to joint 2. The rod has a pivot 11 that is adjustable relative to the central articulated joint 1. If the pivot is adjusted in direction B, as illustrated, or in direction C, the output velocity $ub$ will be increased first and will then be correspondingly reduced relative to the input velocity $ua$. The total time required for one revolution may be constant so that the changes of velocity recur during each revolution.

Figure 7:
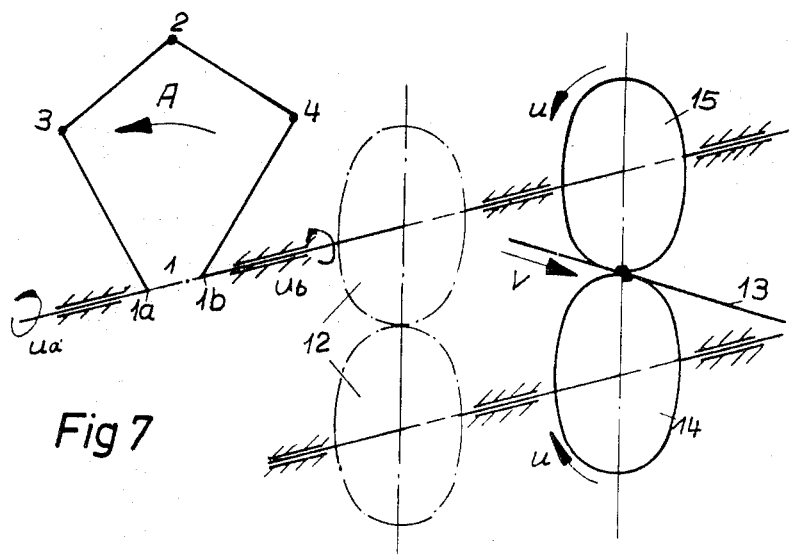
FIG. 7 is a perspective view illustrating how rotary shears are driven by an articulated transmission according to the invention and FIG. 8 is a perspective view showing how flying shears are driven by an articulated transmission according to the invention.

FIG. 7 shows how rotary shears are driven by an articulated transmission 1 to 4 according to the invention. Power is received at an input velocity $ua$ by $1a$ and is delivered at an output velocity $ub$ from $1b$ to the gear train 12. The metal strip 13 travels at the velocity $v$ between knives 14 and 15. During the cutting operation, the peripheral velocity $u$ of the knives must be equal to the speed of travel $v$ of the strip in order to prevent a buckling or elongation of the strip metal 1. When it is desired to vary the length of the cut sections, the peripheral velocity $u$ of the knives in the noncutting portion of their orbit must be correspondingly increased or decreased whereas $u$ must always be equal to $v$ during the cutting operation. Hence, the length of the cut sections can be infinitely varied in an operation which involves intermittent cutting.

Figure 8:
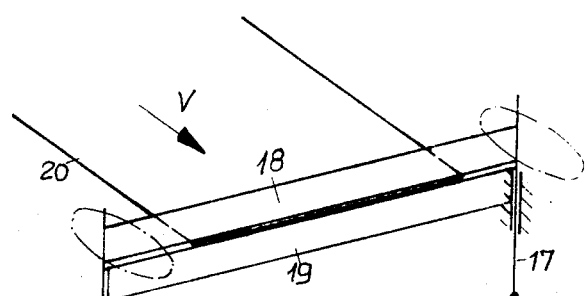
Figure 8:
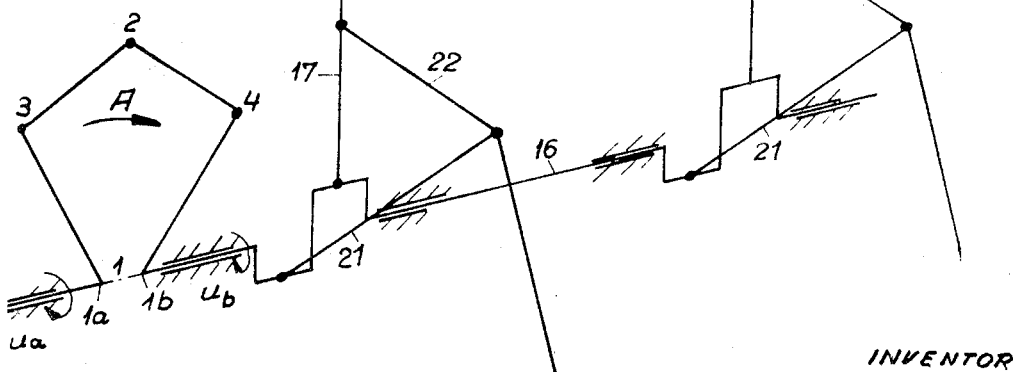

FIG. 8 shows finally how flying shears are driven by an articulated transmission 1 to 4 according to the invention. Power is again applied at a velocity $ua$ to $1a$ and is delivered from $1b$ at a velocity $ub$ to the crankshaft 16. As is apparent, the crankshaft drives by means of connecting rods the upper knife 18, on which the lower knife 19 is guided in usual manner. The oscillating movement of the knives 18, 19 whereby the latter are caused to travel with the strip 20 at the same velocity as the latter is produced by oscillating linkages 21, 22. The cutting motion of the lower knife may be derived in known manner from the crankshaft 16 by means of a transmission having a second crankshaft. This is not separately shown here. When it is desired to cut sections of different lengths, the speed at which the knives travel with the strip is matched to the speed of travel $v$ of the strip by a change of the velocity $ub$ at the output of the articulated transmission 1 to 4 in accordance with the embodiment which has been described hereinbefore.

What I claim is:

1. An articulated rotary transmission, which comprises a quadrilateral linkage comprising a double articulated joint having input and output members which are mounted on a common central axis for rotation relative to each other; an outer articulated joint spaced from said double articulated joint and arranged to revolve about said axis; first and second lateral articulated joints connecting said outer articulated joint to said input and output members respectively, said outer articulated joint being movable to vary the spacing between it and said double articulated joint; and positioning means structurally independent of said outer articulated joint and operatively arranged to cooperate with said outer articulated joint for controllably varying the distance between said outer articulated joint and said double articulated joint during revolution of said outer articulated joint, so that the relation of the rotational speeds of said input and output members is variable in a controllable manner.

2. An articulated rotary transmission as defined in claim 1, wherein said positioning means comprises a cam rotatable on said axis.

3. An articulated rotary transmission as defined in claim 1, wherein said positioning means is an elongated unit adjustable in length, connected between said double articulated joint and said outer articulated joint, and rotatable on said axis relative to said input and output members.

4. An articulated rotary transmission as defined in claim 3, wherein said positioning means comprises a piston-cylinder unit.

5. An articulated rotary transmission as defined in claim 1, wherein said positioning means comprises a constraining rod having a first pivot connected to said outer articulated joint and a second pivot spaced in the longitudinal direction of said rod from the first pivot and adjustable as to its distance from said axis.

6. An articulated rotary transmission as defined in claim 1, for use in shearing stock traveling in one direction, further comprising shearing knives for severing said traveling stock into sections of predetermined length, said knives being arranged to move in the same direction as said stock; and motion transmitting means arranged to transmit driving motion from said output member to said knives to vary the speed of movement of said knives in said direction and thus to vary the lengths of said sections independently of the speed of travel of said stock.

7. An articulated rotary transmission as defined in claim 6, wherein said transmitting means comprises reciprocable sliders carrying the knives and connected to the output member to derive a reciprocating driving motion therefrom.

8. An articulated rotary transmission as defined in claim 6, wherein said transmitting means comprises rockers carrying the knives and connected to said output member to derive a rocking motion therefrom.

9. An articulated rotary transmission as defined in claim 6, wherein said transmitting means comprises rotatable means carrying said knives and operatively connected to the output member to derive a rotational driving motion therefrom.